United States Patent [19]
Ikeda

[11] Patent Number: 6,151,614
[45] Date of Patent: Nov. 21, 2000

[54] ADAPTIVE FILTER AND ADAPTING METHOD THEREOF

[75] Inventor: Shigeji Ikeda, Tokyo, Japan

[73] Assignee: NEC Corporation, Tokyo, Japan

[21] Appl. No.: 09/079,720

[22] Filed: May 15, 1998

[30] Foreign Application Priority Data

May 19, 1997 [JP] Japan .................................. 9-128149

[51] Int. Cl.$^7$ .................................................. G06F 17/10
[52] U.S. Cl. ........................................................ 708/322
[58] Field of Search .................................. 708/322, 323, 708/319, 301

[56] References Cited

U.S. PATENT DOCUMENTS

| | | | |
|---|---|---|---|
| 5,636,151 | 6/1997 | Ikeda | 708/322 |
| 5,867,486 | 2/1999 | Sugiyama | 708/322 |
| 5,951,626 | 9/1999 | Duttweiler | 708/322 |

FOREIGN PATENT DOCUMENTS

0793341  9/1997  European Pat. Off. .

OTHER PUBLICATIONS

Ikeda, S., "A Fast Convergence Algorithm for Adaptive Fir Filters With Coarsely Located Taps" Proceeding of International Conference on Acoustics, Speech and Signal Processing 1991, Speech and Signal, pp. 1525–1528.

B. Widrow, et al., "Adaptive Noise Cancelling: Principles and Applications", Proceedings of IEEE, vol. 63, No. 12, Dec. 1975, pp. 1692–1716.

J–I. Nagumo, et al., "A Learning Method for System Identification", IEEE Transactions on Automatic Control, vol. AC–12, No. 3, Jun. 1967, pp. 282–287.

S. Ikeda, et al., "A Fast Convergence Algorithm For Sparse–Tap Adaptive FIR Filters for An Unknown Number of Multiple Echoes", IEEE 1994, vol. III, pp. 41–44.

*Primary Examiner*—David H. Malzahn
*Attorney, Agent, or Firm*—Ostrolenk, Faber, Gerb & Soffen, LLP

[57] ABSTRACT

An object of this invention is to provide an adaptive filter capable of reducing a convergence time and residual error even when there exists an interval having a small input signal power for a long time, and an adapting method thereof. The adaptive filter comprises a signal power monitoring circuit for receiving an input signal and outputs of delay elements and outputting a first stop signal for stopping tap position control and a second stop signal for stopping coefficient updating and a coefficient updating control circuit for receiving the second stop signal and an error signal outputted by a subtracter and outputting the error signal or zero to coefficient generating circuits as an updating signal. The signal power monitoring circuit calculates a sum of powers of all or part of signals of the delay elements, so that if the power sum is smaller than a first threshold, it turns on the first stop signal to stop the tap position control and if the sum is smaller than a second threshold, turns on the second signal to stop the coefficient updating.

5 Claims, 3 Drawing Sheets

ADAPTIVE FILTER AND ADAPTING METHOD THEREOF

BACKGROUND OF THE INVENTION

1. Field of the Invention

This invention relates to an adaptive filter and adapting method thereof and more particularly to an adaptive filter for use for identification of a unknown system of transmission path, space acoustical coupling path and the like and an adapting method thereof.

2. Description of the Related Art

As application of the identification way for identifying an unknown system by an adaptive filter, an echo canceller, noise canceller, howling canceller, adaptive equalizer and the like are well known. The case of an echo canceller which removes an echo leaking from a sending side to a receiving side, e.g., from the four-wire side of a two-wire/four-wire conversion circuit, as an example of related conventional technology, will be described.

The echo canceller generates a dummy echo (echo replica) corresponding to a sending signal by using an adaptive filter having more tap coefficients than an impulse response length of an echo path, in order to suppress an echo leaking from a sending circuit into a receiving circuit in the four-wire side of the two-wire/four-wire conversion circuit.

Typical references for a coefficient correcting algorithm for the adaptive filter for use in the above case, are "Adaptive Noise Cancelling: Principle and Applications", Proceedings of IEEE, No. 12 of 63 volumes, 1975, pp. 1692–1716 (hereinafter referred to as reference 1) and "A Learning Method for System Identification", IEEE Transactions on Automatic Control, No. 3 of 12 volumes, 1967, pp. 282–287 (hereinafter referred to as reference 2) have been known since before.

If there exists a fixed delay between a point on a four-wire circuit in which the echo canceller is inserted and a point of the two-wire/four-wire conversion circuit, the number of taps of the echo canceller needs to be large enough for covering an expected maximum fixed delay amount and response wave form of substantial impulse response. Therefore, if the fixed delay amount is large, the number of taps increases tremendously thereby inducing expansion of hardware size and increase of convergence time due to coefficient mutual interference.

To solve these problems, a method for adaptive control on coefficient allocation by estimating a position of waveform response portion excluding fixed delay portions from impulse response of echo path and then allocating tap coefficients of the adaptive filter around the estimated position has been proposed. ("A Fast Convergence Algorithm for Adaptive FIR Filters with Coarsely Located Taps", Proceeding of International Conference on Acoustics, Speech and Signal Processing 1991, 1991, pp. 1525–528, (hereinafter referred to as "reference 3)).

A point indicated by the reference 3 is to reduce convergence time by estimating a position of the response waveform portion and allocating the taps only near that position. However, according to this method, the estimation of the response waveform position is carried out with the maximum value of the tap coefficient absolute value and only one range in which the tap coefficient allocation is limited is specified. Thus, if there are plural waveform response portions (in case of echo, called multi-echo), the tap allocation limited range must be determined so as to cover all these. If there is a large fixed delay between the respective waveform response portions, an effect of limiting the tap allocation position is reduced so that increase of the convergence time is unavoidable.

To solve this problem, a method in which a fast convergence for the multi-echoes is ensured and the tap coefficients are allocated only at the waveform response portion has been proposed in "A Fast Convergence Algorithm for Sparse-Tap Adaptive FIR Filters for An Unknown Number of Multiple Echoes", 1994, Vol. III, pp. 41–44 (hereinafter referred to as "reference 4)".

FIG. 2 shows a block diagram of a structure of the echo canceller proposed in the "Reference 4". The adaptive filter shown in FIG. 2 contains (N-1) delay elements which delay sending signal inputted from a sending signal input terminal 1, delay element $20_1$—delay element $20_{N-1}$ so that the total number of taps is N including a tap in which delay is 0.

On the other hand, to generate the tap coefficients of the adaptive filter, L coefficient generating circuits $30_1$–$30_L$ are provided. The total tap number of the adaptive filter and coefficient generating circuit number L have a relation of N>L. That is, the adaptive filter shown in FIG. 2 is different from the conventional adaptive filter and provided with a tap coefficient substantially capable of realizing a substantial waveform response portion. Then, by allocating that tap coefficient adaptively at the response waveform, an echo replica is generated.

Therefore, a path switch 7 is provided for switching a connection between the output of the delay element and coefficient generating circuit and further a tap control circuit 50 is provided for controlling this path switch 7. The delay signal of each output of the path switch 7 is supplied to a corresponding coefficient generating circuits $30_1$–$30_L$ and multipliers $40_1$–$40_L$. The multipliers $40_1$–$40_L$ multiply the tap coefficient values outputted by the coefficient generating circuits $30_1$–$30_L$ and the delay signals outputted by the path switches 7 and then supply the results to an adding circuit 8. The adding circuit 8 adds multiplication results of the multipliers $40_1$–$40_L$ to output the echo replica.

The sending signal inputted to the sending signal input terminal 1 is sent from a sending signal output terminal 2 and then transmitted to the two-wire side by the two-wire/four-wire conversion circuit 3. However, a part of the signal leaks into the receiving side because of impedance unmatching. An echo inputted from a reception signal input terminal 4 is supplied to a subtracter 5. As for the signal at the reception signal input terminal 4, the echo replica outputted from the adder 8 is subtracted by the subtracter 5 and an obtained subtraction result is transmitted to the reception signal output terminal 6. Further, the subtraction result is also supplied to the coefficient generating circuits $30_1$–$30_L$ as error signal for coefficient updating.

Now, assuming the LMS algorithm shown in the "Reference 1" as the coefficient updating algorithm, FIG. 3 shows a block diagram indicating a structure of the coefficient generating circuits $30_i$ (i=1, 2, ..., L).

The delay signal and error signal supplied to the coefficient generating circuit $30_i$ are multiplied by the multiplier 31 and further that result is multiplied by a constant $\mu$ by a multiplier 32. An output of the multiplier 32 indicates a correction amount of the coefficient and this is added to a coefficient value stored in a storage circuit 34 by an adder 33. Then, an addition result is returned to the storage circuit 34. A value stored in the storage circuit 34 serves as tap coefficient value.

The storage circuit 34 has a function for making a held coefficient value zero if a coefficient clear signal is inputted from a coefficient clear circuit 55.

As evident from the above description, the tap coefficient of the adaptive filter is connected to only part of the delay elements selected by the path switch 7. Hereinafter, a tap to which the tap coefficient is connected is called valid tap and a tap to which the tap coefficient is not connected is called invalid tap. Actual tap coefficient adaptive allocation control is carried out in the following manner.

First, as the initial value, fewer tap coefficients than the actual total tap number are allocated at the same interval. These taps serve as valid tap and taps for which no coefficient is allocated serve as invalid taps.

Next, the tap control circuit 50 will be described with reference to FIG. 2. A control subgroup storage circuit 60 stores subgroup number representing a tap control subgroup composed of a plurality of continuous tap numbers in the order of control. The number of taps belonging to each tap control subgroup is set equally. If the total tap number is 30 and the number of the tap control subgroups is 5, the number of taps belonging to each tap control subgroup is 6.

If the tap control subgroups are expressed by tap numbers belonging to G(i)(i=1, 2, . . . , 5) enclosed by the parentheses { }, G(1)={0, 1, 2, 3, 4, 5}
G(2)={6, 7, 8, 9, 10, 11}
G(3)={12, 13, 14, 15, 16, 17}
G(4)={18, 19, 20, 21, 22, 23}
G(5)={24, 25, 26, 27, 28, 29}

In the control subgroup storage circuit 60, as the initial value of the tap control subgroup number, the group numbers are set in the order from the smallest one. That is, if the group numbers held in the control subgroup storage circuit 60 are expressed by Z(n) (n=1, 2, . . . , 5), each group is initially set as follows:

Z(1)=1
Z(2)=2
Z(3)=3
Z(4)=4
Z(5)=5

An address pointer for specifying a data reading position of the control subgroup storage circuit 60 is initially set at a head and a head group number is outputted or in the above a first group number, and that group number is outputted. In the above example, Z(1)=1 is outputted.

The invalid tap storage circuit 52 has FIFO (first-in-first-out) structure and stores (N-L) invalid tap numbers. N is total number of taps and L is the number of valid taps.

The tap number calculating circuit 54 calculates total tap numbers excluding the invalid tap numbers stored by the invalid tap storage circuit 52, namely the valid tap numbers, and supplies the calculated tap numbers to the path switch 7 as a tap changeover control signal. The path switch 7 operates to select outputs of the delay elements corresponding to L valid tap numbers sent from the tap number calculating circuit 54 and transmits that output to the coefficient generating circuits 30.

The invalid tap number at the initial state or the initial setting value of the invalid tap storage circuit 52 is selected so that the valid tap numbers are allocated in the order from the smallest value. For example, if it is set that total tap number N=30, valid tap number L=10, invalid tap number N-L=20, the total tap number is 0, 1, 2, . . . , 29. At this time, as the valid tap number, 10 taps are selected from the smallest value as 0, 1, 2, . . . , 9 and the invalid tap number held by the invalid tap storage circuit 52 is initially set to 10, 11, . . . , 29.

After the above initial state setting, coefficient updating for taps (valid taps) selected by the path switch 7 is carried out by the coefficient generating circuits $30_1$–$30_L$. Each time when coefficient updating is carried out Q times (Q is positive number), coefficient allocation or updating of valid tap position is carried out.

This valid tap position updating is carried out in the following procedure. A minimum coefficient detecting circuit 51 receives a valid tap number outputted by the tap number calculating circuit 54 and a tap coefficient outputted by each coefficient generating circuit and then supplies a valid tap number corresponding to a coefficient whose absolute value is minimum to the invalid tap storage circuit 52 and coefficient clear circuit 55.

The coefficient clear circuit 55 outputs a coefficient clear signal to the coefficient generating circuit corresponding to an inputted tap number to set the coefficient whose absolute value is minimum to zero. Because the invalid tap storage circuit 52 is of first-in-first-out (FIFO) structure, the inputted tap number is stored at the rearmost of queue and a tap number located at the head of the queue is transmitted to a determining circuit 53.

A control tap range calculating circuit 61 receives a tap control subgroup number Z(n) outputted from the control subgroup storage circuit 60 and calculates minimum tap number $K_{min}$ and maximum tap number $K_{max}$ of tap numbers belonging to the tap control subgroup or G(Z(n)) and then supplies them to the determining circuit 53.

For example, if Z(n)=1 in the above example, G(Z(n))= G(1)=0, 1, 2, 3, 4, 5, $K_{max}$=5, $K_{min}$=0 are supplied. If a tap number inputted to the determining circuit 53 is larger than $K_{max}$=5 and smaller than $K_{min}$=0, the inputted tap number is returned to the invalid tap storage circuit 52. Then, the next tap number in the invalid tap storage circuit 52 is fetched out and inputted to the determining circuit 53. This repeated procedure is continued while the tap number inputted to the determining circuit 53 is 0–5 or until a determining condition that number belongs to a group of Z(n)=1 is satisfied.

If this determining condition is satisfied, the invalid tap number held by the invalid tap storage circuit 52 is established so that a new valid tap is determined.

By the tap position control limited to a tap control subgroup described above, concentrated allocation of the coefficients is enabled.

On the other hand, change of the tap control subgroup is carried out in the following procedure. An absolute value sum calculating circuit 62 receives a valid tap number outputted by the tap number calculating circuit 54 so as to calculate a coefficient absolute value sum of the valid taps belonging to each tap control subgroup. Each absolute value sum is outputted to a counter 63 and a tap control subgroup number in which the absolute value sums are rearranged in the order from the largest one is outputted to a control subgroup updating circuit 59.

The counter 63 is a counter for counting an updating frequency of the tap coefficient, and each time when the coefficient updating frequency reaches a frequency determined by the coefficient absolute value sum of the valid tap of each tap control subgroup supplied from the absolute value sum calculating circuit 62, supplies a control group change signal to the control subgroup storage circuit 60 and counter 58. That is, the larger the absolute value sum of a control subgroup, the longer the time interval in which the counter 63 outputs a control group change signal is.

For example, when selection of all tap control subgroup is ended, that is, the counter 58 outputs a control subgroup order updating signal to the control subgroup updating circuit 59, it is assumed that the coefficient absolute value sum of the valid taps in each tap control subgroup is {1.0, 4.0, 2.0, 3.0, 0.0}. At this time, the coefficient absolute value sum SUM(i) (i=1, 2, ..., 5) of the valid tap in each tap control subgroup is:

SUM (1)=1.0
SUM (2)=4.0
SUM (3)=2.0
SUM (4)=3.0
SUM (5)=0.0

Now, a relation between limit time (expressed by coefficient updating frequency) to be allocated to each tap control subgroup, $T(i)$ (i=1, 2, ..., 5) and coefficient absolute value sum SUM (i) (i=1,2, ..., 5) is defined as $T(i)=SUM (i) \cdot 100+10$ In this case, $T(i)$ is:

$T(1)=1.0 \cdot 100+10=110$
$T(2)=4.0 \cdot 100+10=410$
$T(3)=2.0 \cdot 100+10=210$
$T(4)=3.0 \cdot 100+10=310$
$T(5)=0.0 \cdot 100+10=10$ The tap control subgroup limit order $Z(i)$ (i=1, 2, ..., 5) is the order of subgroup.

Z (1)=2
Z (2)=4
Z (3)=3
Z (4)=1
Z (5)=5

As evident from the above description, because the tap control range is moved over all taps in succession, even if there are a plurality of substantial waveform response portions such as multiechoes, the tap coefficients can be allocated.

Further, by the tap position control of determining a time taken for changing the limit subgroup from one subgroup to another subgroup, depending on the importance of each subgroup, the more important control subgroup remains the limited subgroup for a longer time, so that the tap coefficients are allocated with precedence over the waveform response portion of the impulse response. As a result, a fast convergence is achieved.

A problem of the conventional art described up to now exists in that because the conventional art is based on tap position control based on growth of the filter coefficient, if the input signal is a signal whose power is not constant like voice signal or the like, that is, there exists no-sound interval or an interval having noise alone, an increase of convergence time may be induced. The reason is as follows. If filter power of a tap belonging to a selected tap control subgroup is very small or the noise component of the signal is large, even if a coefficient of that subgroup is located at a tap position in which the coefficient must grow, stable coefficient growth cannot be expected. As a result, the tap position control is carried out in such a condition in which coefficient growth is difficult, so that the tap position control is not carried out properly.

SUMMARY OF THE INVENTION

An object of the present invention is to provide an adaptive filter capable of achieving a fast convergence even when input signal power fluctuates, and an adapting method thereof.

To achieve the above object, the present invention provides an adaptive filter comprising: a plurality of delay elements connected in series for providing an input signal from an unknown system with a delay; a path switch which selects and outputs a subset of the output signals of the plurality of delay elements as valid taps a plurality of coefficient generating circuits which receive the output signal, updating signal and coefficient clear signal of the path switch as each input signal so as to generate each tap coefficient value of the valid tap; a plurality of multipliers for multiplying each output coefficient value of the plurality of coefficient generating circuits and output signal of the path switch; an adder for adding output multiplication results of the plurality of multipliers and outputting identification signal; a subtractor for subtracting the identification signal from the output signal of the unknown system so as to generate an output error signal; and a tap control circuit which receives each output coefficient value of the plurality of coefficient generating circuits, each output signal of the plurality of delay elements and the error signal, divides all taps into plurality of tap control subgroups composed of continuous taps of the same number, changes a tap control subgroup selected in the tap control subgroup each predetermined times of coefficient updating in the order of selection, determines the selection order and time of coefficient updating by using information of coefficient absolute value sum of the valid tap in each tap control subgroup, and calculates electric power sum of all or part of output signals of the plurality of delay elements so as to generate the path switch changeover control signal, the coefficient clear signal and the updating signal.

Further according to another aspect, the present invention provides an adapting method of an adaptive filter comprising the steps of: dividing all taps of an adaptive filter to a plurality of tap control subgroups composed of equal number of contiguous taps and storing numbers of part of selected taps of the all taps as valid tap; storing tap numbers other than the valid tap numbers in queue as invalid tap number; each time when coefficient values of taps corresponding to the valid tap numbers are updated predetermined times, storing a tap number having a coefficient value whose absolute value is minimum of the coefficients of the taps corresponding to the valid tap numbers, fetching an invalid tap number located at a head of the queue, and if it is a tap number belonging to a tap control subgroup selected from the tap control subgroup, making that tap number a valid tap number; when the invalid tap number is not a tap number belonging to the selected one tap control subgroup, storing that invalid tap number at the rearmost of the queue without making it a valid tap number; adaptively controlling a tap position by repeating comparison between the invalid tap number and a tap number belonging to the selected one tap control subgroup until an invalid tap number read from the queue becomes valid; and changing the selected one tap control subgroup in the order of selection each time when predetermined coefficient updating times are reached, wherein the selection order and the predetermined coefficient updating times are determined by using information of coefficient absolute value sum of valid taps in each tap control subgroup so as to adaptively control the tap position, the adapting method further comprising the steps of: stopping the tap position control when a sum of filter power of all or part of taps is below a predetermined first threshold; and stopping the coefficient updating proceeding when the power sum is below a predetermined second threshold.

According to the present invention, control based on filter signal power is carried out. If the sum of signal powers of all taps or part of the taps of a filter is smaller than a first threshold, the tap changeover control is stopped. If the signal power sum is smaller than a predetermined second threshold, the coefficient updating is stopped. According to this proposed method, the operations for the coefficient updating processing and tap changeover control are controlled depending on a value of the filter signal power. Therefore, even if there exists an interval having a small input signal power, proper tap position control can be performed. Thus, a fast convergence can be realized. Further, because the tap changeover stop and coefficient updating stop are controlled depending on different thresholds, the tap changeover stop and coefficient updating stop can be controlled independently.

DESCRIPTION OF THE PREFERRED EMBODIMENTS

Figure 1:
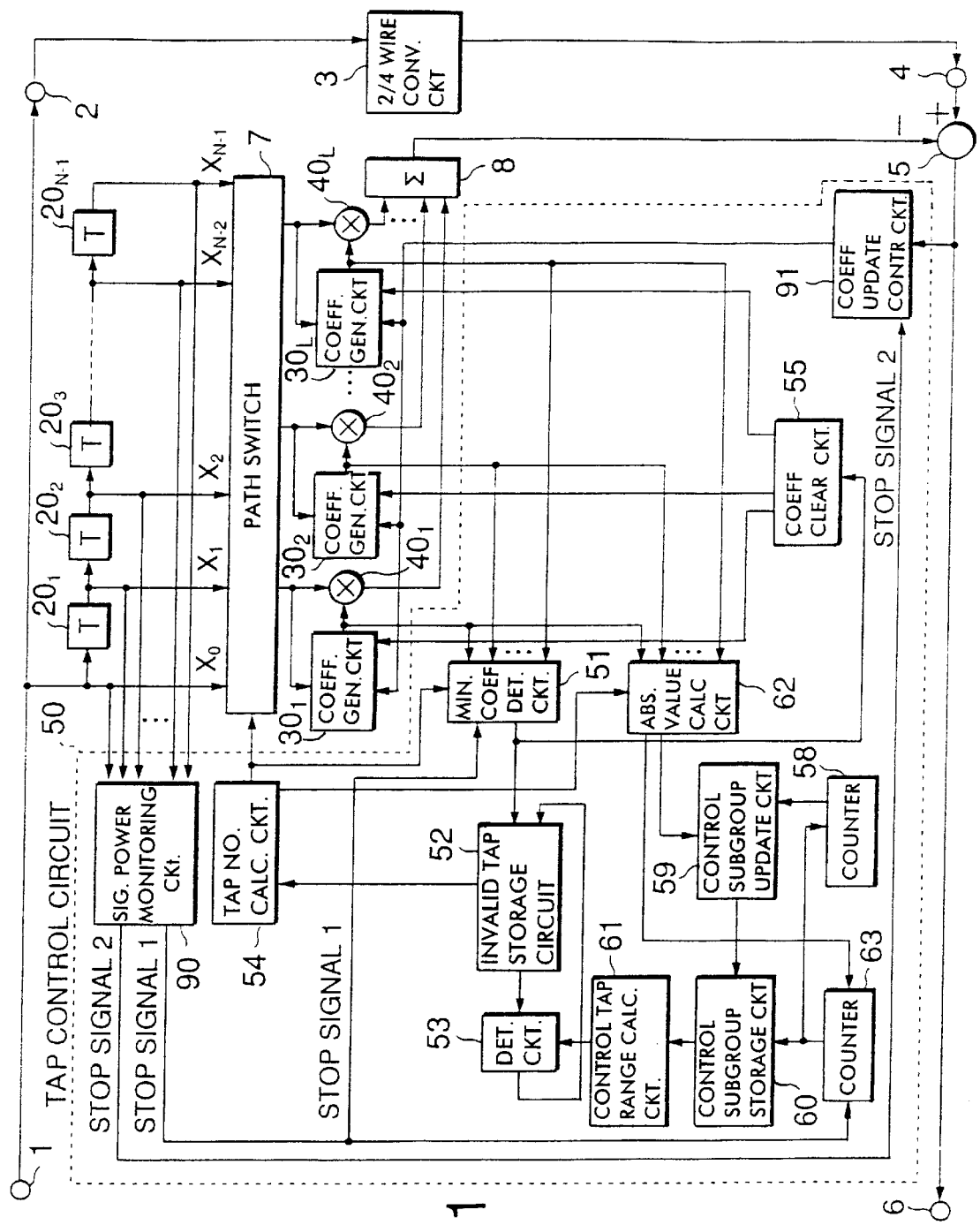
FIG. 1 is a block diagram showing an embodiment of the present invention.
Figure 2:
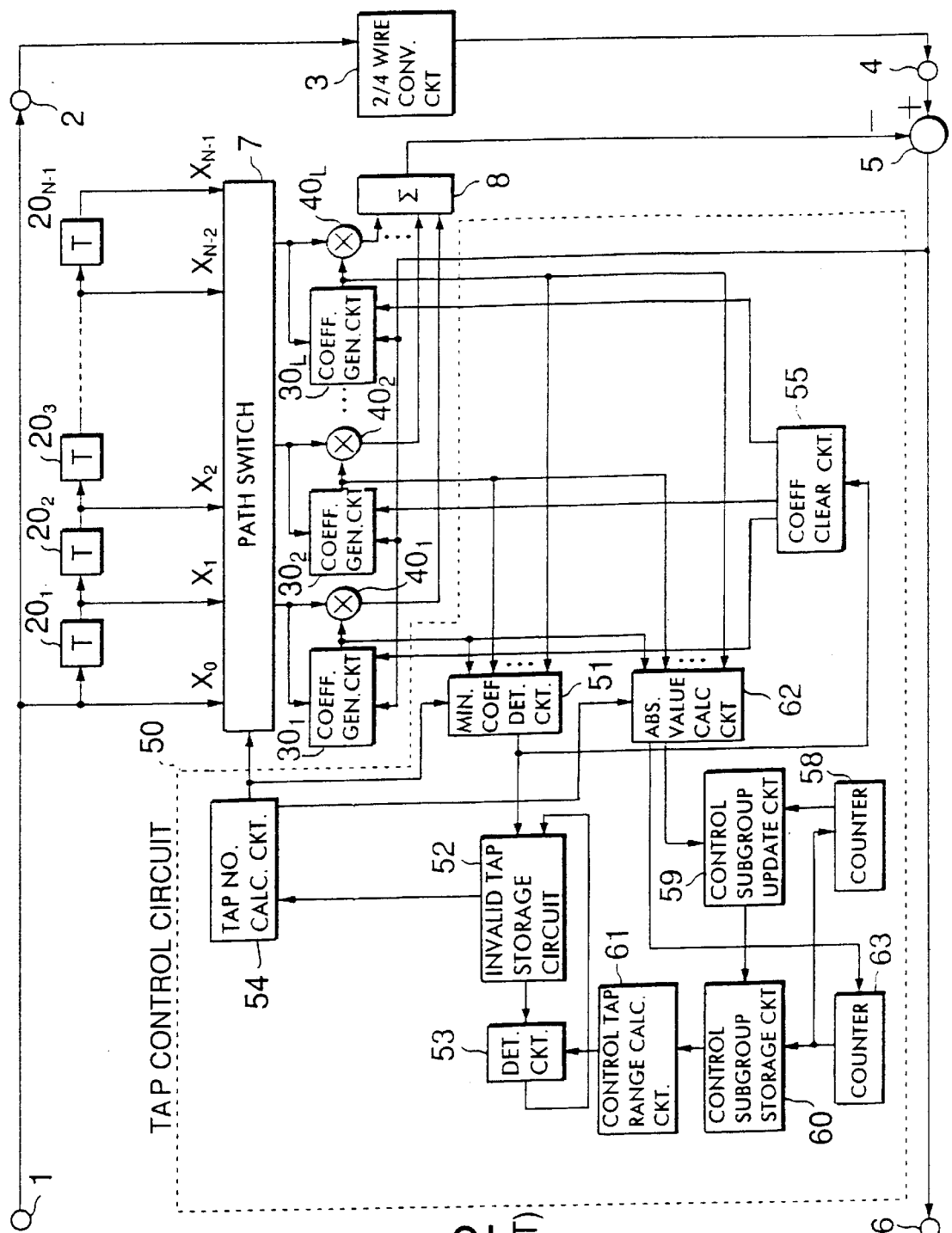
FIG. 2 is a block diagram showing a structure of a conventional adaptive filter.
Figure 3:
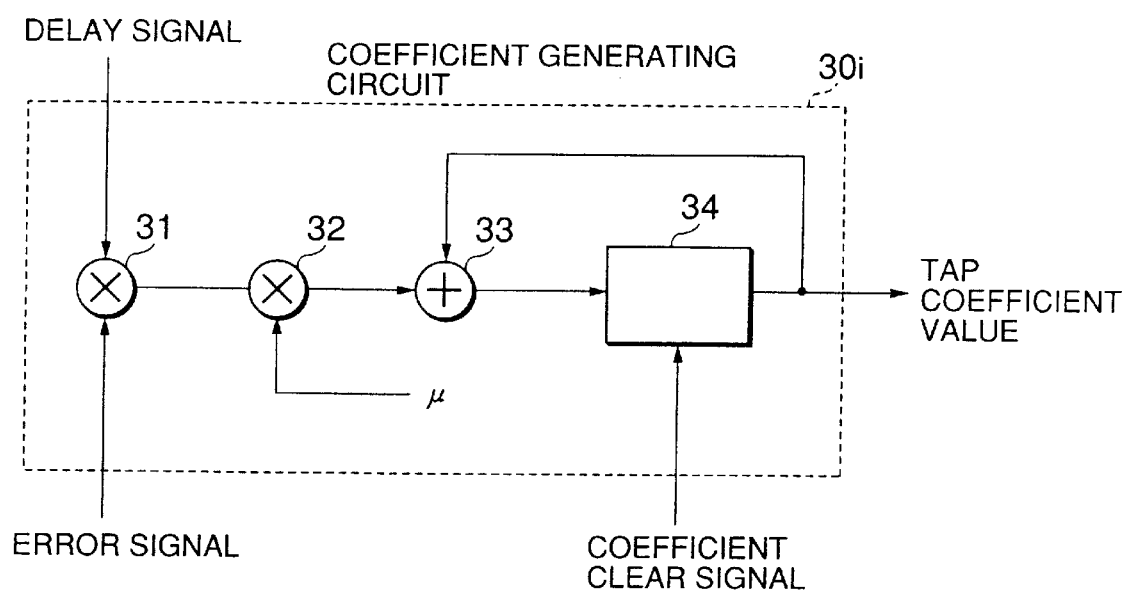
FIG. 3 is a block diagram showing a structure of a coefficient generating circuit of FIG. 2.

The embodiment of the present invention will be described in detail with reference to the accompanying drawings. FIG. 1 is a block diagram showing an embodiment of the present invention, in which the same components as in FIG. 2 are expressed by the same reference numerals. FIG. 1 is equal to FIG. 2 except a signal power monitoring circuit 90 and a coefficient updating control circuit 91. Therefore, mainly the operations of the signal power monitoring circuit 90 and coefficient updating control circuit 91 will be described.

The signal power monitoring circuit 90 receives an input signal $X_0$ corresponding to delay 0 and outputs $X_1$–$X_{N-1}$ of (N-1) delay elements from the delay element $20_1$ to the delay element $20_{N-1}$ so as to calculate a sum of signal powers of all taps or a predetermined part of taps.

For example, if, with all tap number N=30, calculation of signal power is intended for all taps, the power sum $P_{SUM}$ is as follows:

$$P_{SUM} = \sum_{z=0}^{29} x_z^2$$

If the calculation of signal power is intended for five contiguous taps from a head of the taps, the power sum $P_{SUM}$ is as follows:

$$P_{SUM} = \sum_{z=0}^{4} x_z^2$$

After calculation of the power sum is finished, the signal power monitoring circuit 90 compares the calculated $P_{SUM}$ with a predetermined power threshold $P_{TH1}$. If $P_{SUM} \geq P_{TH1}$, a first stop signal is turned off. If $P_{SUM} < P_{TH1}$, the first stop signal is turned on and outputted to a minimum coefficient detecting circuit 51 and counter 63.

If the inputted first stop signal is on, the minimum coefficient detecting circuit 51 stops supply of a valid tap number corresponding to a coefficient whose absolute value is minimum to an invalid tap storage circuit 52 and a coefficient clear circuit 55. Further, if the first stop signal is on, a counter 63 stops counting operation. As a result, if the first stop signal is on, tap position changeover control is stopped.

On the other hand, the calculated Psum is compared with a predetermined power threshold $P_{TH2}$. If $P_{SUM} \geq P_{TH2}$, the second stop signal is turned off. If $P_{SUM} < P_{TH2}$, the second stop signal is turned on and outputted to a coefficient updating control circuit 91.

The coefficient updating control circuit 91 receives a second stop signal and an error signal. If the second stop signal is off, the error signal is outputted to coefficient generating circuits $30_1$–$30_L$ as an updating signal. If the second stop signal is on, zero is outputted to the coefficient generating circuits $30_1$–$30_L$ as the updating signal. If the updating signal is zero, a coefficient updating amount is zero, thereby leading to stop of the coefficient updating processing.

Meanwhile, a first threshold for stopping the tap position control and a second threshold for stopping the coefficient updating can be set independently. Thus, by setting the second threshold to be smaller than the first threshold, the tap position control can be stopped so that only the coefficient updating can be operated. Although this is insufficient for carrying out the tap position control stably, it is effective when there is ensured a signal power substantially capable of carrying out the coefficient updating, because growth of the coefficient is enabled by carrying out the coefficient updating.

As described, according to the present invention, the signal power of all taps or part of the taps of a filter is monitored. If the signal power is smaller than a first threshold, tap changeover control is stopped. If the signal power is smaller than a second threshold, coefficient updating is stopped. As a result, if there exists an interval having a small input signal power, proper tap position control can be performed, so that a fast convergence can be realized. Further because tap position control stop and coefficient updating stop are controlled by different thresholds, it is possible to stop the tap position control alone, thereby preventing deterioration of convergence.

Although the embodiment of the present invention has been described in detail, by taking an echo canceller as an example, the present invention can be applied to a noise canceller, howling canceller, adaptive equalizer and the like under the same principle. Further, as for tap coefficient updating algorithm, instead of an algorithm used as an example, various algorithms can be applied.

What is claimed is:

1. An adaptive filter comprising:
   an input terminal for a filter input signal;
   a delay circuit comprised of a plurality of delay elements connected in series, the first delay element in the series having an input terminal connected to the filter input terminal, and a plurality of output taps, the first of the taps being connected to the filter input terminal to provide a zero-delay tap, and the remaining output taps being connected to the outputs of each of the delay elements;
   a path switch having a plurality of input terminals, each connected to one of the output taps, and being responsive to a path switch control signal to connect selected ones of the taps to outputs of the path switch as valid taps;
   a plurality of coefficient generating circuits, each connected to one of the outputs of the path switch, and responsive to the value of a signal at the connected path switch output, to an updating signal and to a coefficient clear signal to generate a tap coefficient value for one of the valid taps;

a multiplier for each of the valid taps, each multiplier connected to the output of one of the coefficient generating circuits and to the output of the path switch for the corresponding valid tap;

an adder for adding the outputs of the plurality of multipliers to generate an identification signal;

a subtraction circuit for subtracting the identification input signal from the filter input signal to generate an error signal; and a tap control circuit responsive to the tap coefficient values for the valid taps, to signals at the output taps of the delay circuit and to the error signal, to perform the following functions:

to divide all of the taps into a plurality of control subgroups comprised of equal numbers of contiguous taps;

to select one of the control subgroups for updating a predetermined number of times in a particular selection order, the predetermined times and the selection order being based on the sums of the absolute values of the tap coefficients of valid taps in each of the control subgroups, to calculate an electric power value representing the sum of at least a selected sub-plurality of the output tap signals; and, based on the calculated sum, to generate the path switch control signal, the coefficient clear signal and the updating signal.

2. An adaptive filter according to claim 1 wherein:

the tap control circuit comprises a minimum coefficient detecting circuit for comparing the coefficient values for the valid taps and for generating a signal representing the tap number of the valid tap whose tap coefficient has the minimum absolute value;

a first storage circuit having a first-in-first-out memory structure for storing the tap number outputted by the minimum coefficient detecting circuit as invalid tap number;

a tap number calculating circuit for generating the tap numbers for the valid taps, for providing input signals to the minimum coefficient detecting circuit and for supplying the control signal to the path switch;

a coefficient clear circuit for providing a coefficient clear signal to the coefficient generating circuit for a tap corresponding to a tap number provided by the minimum coefficient detecting circuit;

a second storage circuit for storing numbers representing a particular selection order for the tap control subgroups;

a control tap range calculating circuit for generating signals representing the maximum and minimum values of the tap numbers in the selected control subgroup;

a determination circuit for reading an invalid tap number from the first storage circuit and for determining if the tap number read is in a range between the maximum and minimum values for the selected control subgroup, and if the tap number is not in the range, storing the invalid tap number in the first storage circuit;

an absolute value sum calculating circuit responsive to the numbers of the valid taps and the corresponding tap coefficient values for calculating the sums of the absolute values of the coefficients for the valid taps belonging to each tap control subgroup and outputting the control subgroup numbers arranged in descending order of the coefficient absolute value sums;

a first counter for receiving the coefficient absolute value sums outputted by the absolute value sum calculating circuit and the first stop signal and for outputting a change signal for changing the selected control subgroup and for providing the number of the new selected control subgroup to the second storage circuit each time the coefficient updating time reaches a predetermined time;

a second counter for producing an order updating signal for the control subgroups each time the change signal is outputted a predetermined number of times;

a control subgroup updating circuit responsive to the output of the second counter for writing the output of the absolute value sum calculating circuit into the second storage circuit;

a coefficient updating control circuit responsive to an error signal from the subtraction circuit and to a second stop signal, to provide the error signal as the updating signal when the second stop signal is off and to provide a zero output as the updating signal when the second stop signal is on; and a signal power monitoring circuit selected sub-plurality of delay elements, calculating for the electric power value, for stopping tap position control processing by setting the first stop signal to on when the electric power sum is below a predetermined first threshold and for stopping coefficient updating by setting the second stop signal to on when the electric power sum is below a predetermined second threshold.

3. An adaptive filter according to claim 2, wherein the coefficient generating circuit comprises:

a storage circuit for the tap coefficient value having first and second inputs;

a first multiplier for multiplying an output signal from the path switch and an output updating signal from the coefficient updating control circuit;

a second multiplier for multiplying the output of the first multiplier and a predetermined constant; and an adder having a first input connected to the output of the second multiplier a second input connected to the output of the storage circuit;

the first input to the storage circuit being provided by the coefficient clear signal, and the second input being provided by the output of the adder;

a storage circuit for holding the output signal of the adder as the coefficient value and outputting to the adder as the return signal, wherein when the coefficient clear signal is inputted, storage content is cleared.

4. An adaptive filter according to claim 1, wherein the coefficient generating circuit comprises:

a storage circuit for the tap coefficient value having first and second inputs;

a first multiplier for multiplying an output signal from the path switch and an output updating signal from the coefficient updating control circuit;

a second multiplier for multiplying the output of the first multiplier and a predetermined constant; and an adder having a first input connected to the output of the second multiplier a second input connected to the output of the storage circuit;

the first input to the storage circuit being provided by the coefficient clear signal, and the second input being provided by the output of the adder.

a storage circuit for holding the output signal of the adder as the coefficient value and outputting to the adder as the return signal, wherein when the coefficient clear signal is inputted, storage content is cleared.

5. An adapting method for an adaptive filter including a delay circuit having a plurality of delay elements and providing a zero-delay tap and a plurality delay taps, the method comprising the steps of:

dividing all of the taps into a plurality of tap control subgroups, each comprised of an equal number of contiguous taps;

selecting one of the tap control subgroups as an active subgroup;

establishing a subset of all of the taps as valid taps;

storing identifying numbers for the valid taps;

storing identifying numbers for the taps other than the valid taps in a queue as invalid tap numbers;

repeatedly updating coefficient values for the valid taps;

repeatedly comparing the coefficient values for the valid taps and generating a signal representing the identifying number of the valid tap whose tap coefficient has the minimum absolute value;

each time the tap coefficient values have been updated a predetermined number of times, storing the identifying number of the valid tap whose tap coefficient has the minimum absolute value at the end of the queue of invalid tap numbers;

fetching an invalid tap number from the head of the queue, and if it is a tap number belonging to the active tap control subgroup, making that tap number a valid tap number, but if the invalid tap number is not a tap number belonging to the active tap control subgroup, storing that invalid tap number at the end of the queue without making it a valid tap number;

adaptively controlling the filter tap positions by repeatedly fetching invalid tap numbers from the head of the queue, and selecting as a new valid tap, one whose the tap number corresponds to a tap in the active tap control subgroup; and selecting a new active tap control subgroup in an established selection order each time predetermined coefficient updating times are reached;

determining the predetermined coefficient updating times based on the sums of the absolute values of the coefficient of valid taps in each tap control subgroup;

determining the selection order by ranking the sums absolute coefficient absolute values in descending order, thereby adaptively controlling the tap position, the adapting method further comprising the steps of:

determining the sum of power outputs of at least a selected sub-plurality of the taps;

stopping the selection of new valid taps when the power sum is below a predetermined first threshold; and stopping the updating of tap coefficients when the power sum is below a predetermined second threshold.

* * * * *